United States Patent
Asada et al.

[11] 3,859,846
[45] Jan. 14, 1975

[54] ULTRASONIC INTERFACE METER

[75] Inventors: Hidekazu Asada, Tokyo; Kohzoh Tamura, Chigasaki, both of Japan

[73] Assignee: Kabushiki Kaisha Tokyo Keikio (Tokyo Keiki Co., Ltd.), Tokyo, Japan

[22] Filed: Dec. 20, 1972

[21] Appl. No.: 317,098

[30] Foreign Application Priority Data
Dec. 26, 1971   Japan.................................. 46-3827

[52] U.S. Cl............. 73/67.7, 73/61.1 R, 73/194 A
[51] Int. Cl. ............................................. G01n 3/00
[58] Field of Search ......... 73/67.5, 67.6, 67.7, 67.8, 73/67.5 R, 67.8 R, 194 A, 61.1 R

[56] References Cited
UNITED STATES PATENTS

| | | | |
|---|---|---|---|
| 2,912,856 | 11/1959 | Kritz ................................. | 73/67.5 R |
| 2,993,373 | 7/1961 | Kritz ................................. | 73/67.5 R |
| 3,204,457 | 9/1965 | Howatt............................... | 73/67.5 R |
| 3,237,453 | 3/1966 | Yamamoto ....................... | 73/194 A |

OTHER PUBLICATIONS
Ficken et al., "Simple Form of 'Sing-Around' Method," Jour. Acous. So. Am., 28:5 p. 921–23, Sept. 1956.

*Primary Examiner*—Richard C. Queisser
*Assistant Examiner*—Stephen A. Kreitman
*Attorney, Agent, or Firm*—Hill, Gross, Simpson, Van Santen, Steadman, Chiara & Simpson

[57] ABSTRACT

An ultrasonic interface meter having ultrasonic wave transmitting and receiving elements mounted on a pipe through which liquids are transferred, and in which a signal transmitter circuit applies an electrical signal to the transmitting element, and an electric circuit for receiving the electrical signal from the receiving element to control the signal transmitter circuit so as to achieve a so-called sing-around operation, and an indicator means for indicating the sound velocity in said liquids. In this case, the ultrasonic wave is emitted into the liquid from the transmitting element in a direction oblique to the flow direction of the liquid in the pipe and is received by the receiving element after passing through said liquid.

7 Claims, 11 Drawing Figures

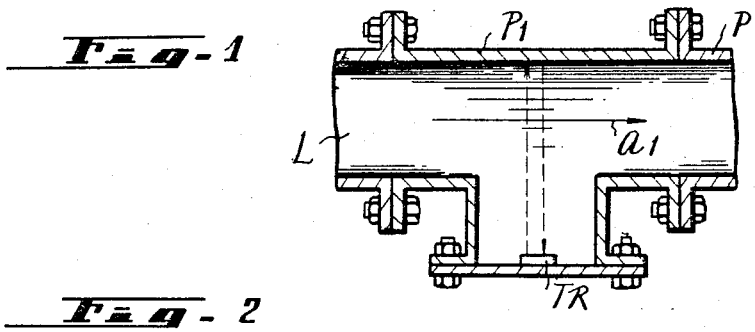
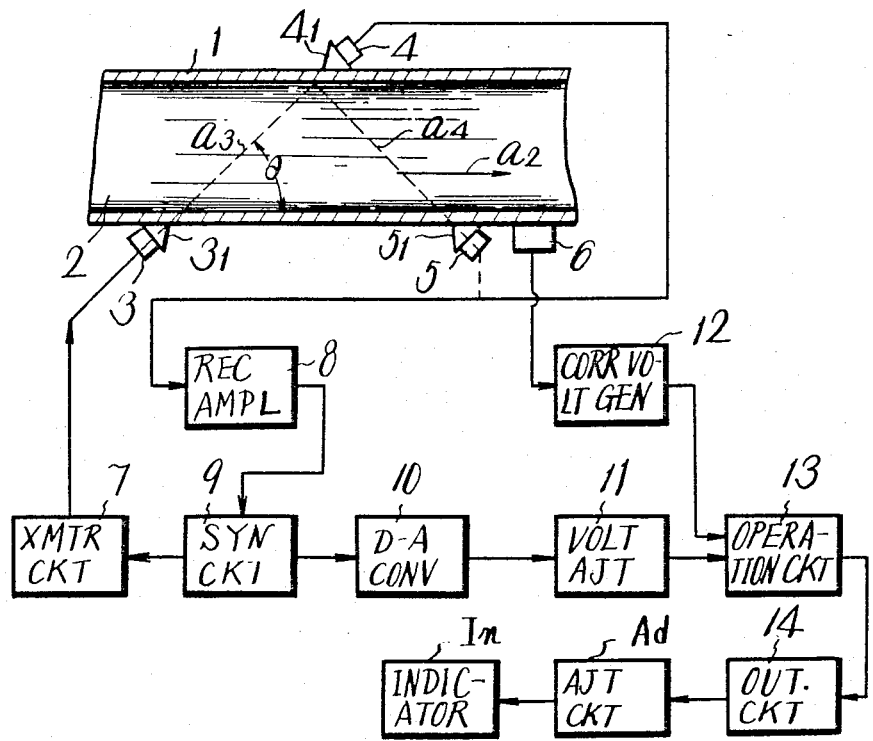
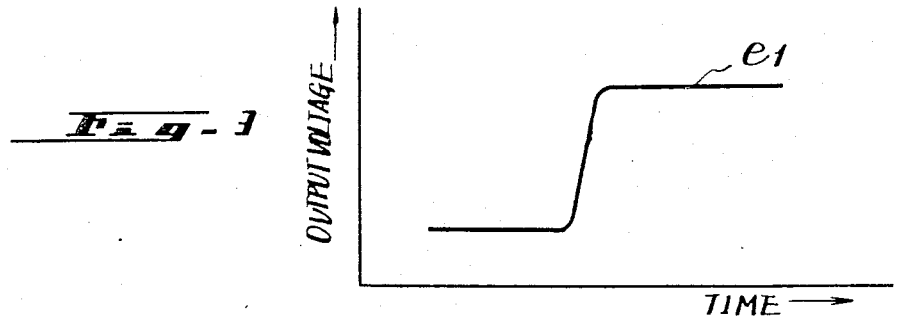

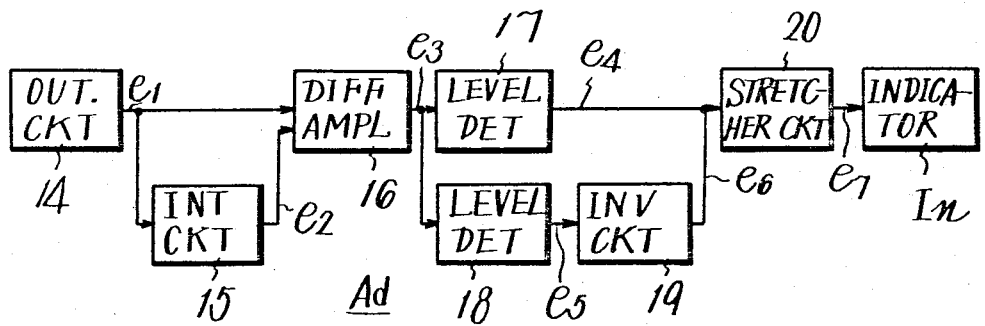

ULTRASONIC INTERFACE METER

BACKGROUND OF THE INVENTION

1. Field of the Invention

The present invention relates generally to an ultrasonic interface meter and more particularly to an ultrasonic interface meter for detecting a boundary or interface between different liquids such as kerosene, light oil (or fuel oil), gasoline and the like which are transferred through the same pipe line.

2. Description of the Prior Art

A device for detecting a boundary between different liquids has been proposed which is a gravity meter or refracto-meter. The detecting device of such type has a drawback in that it requires a sample and hence it can not directly detect a boundary between different liquids such as gasoline, kerosene and the like transferred passing through a common pipe line.

An ultrasonic interface meter for detecting a boundary between different liquids has been also proposed such as shown in FIG. 1. In the conventional ultrasonic interface meter for detecting a boundary between different liquids such as shown in FIG. 1, a pipe $P_1$ provided with an ultrasonic wave transmitting and receiving element TR therein is connected to a common pipe P through which pass liquids L such, for example, as gasoline, kerosene and so on. In this case, an ultrasonic wave is emitted from the element TR into the liquid L in the direction substantially perpendicular to the flow direction $a_1$ of the liquid L as shown by the dotted line in FIG. 1 and the ultrasonic wave is reflected on the opposite inner wall of the pipe $P_1$ parallel to the flow direction $a_1$ after passes through the liquid L and again passing through the liquid L in the direction substantially perpendicular to the direction $a_1$ and is received by the same element TR to thereby detect the boundary between different liquids flowing through the pipe P. With the conventional ultrasonic interface meter mentioned above, since both the ultrasonic wave emitted from the element TR and that reflected on the opposite inner wall of the pipe $P_1$ travel through the liquid L in the direction substantially perpendicular to the flow direction $a_1$, a multiple reflection of the ultrasonic wave occurs which makes it difficult to detect the boundary positively and accurately. As a result, the detection of the boundary between different liquids is inaccurate. Further, it is rather difficult from a practical point of view to connect the pipe $P_1$ and the ultrasonic wave transmitting and receiving element TR.

SUMMARY OF THE INVENTION

Accordingly, the present invention has its main object to provide an ultrasonic interface meter for detecting a boundary between different liquids free from the drawbacks encountered in the prior art.

It is another object of the present invention to provide an ultrasonic interface meter for detecting a boundary between different liquids which can detect the boundary positively and accurately.

It is a further object of the present invention to provide an ultrasonic interface meter for detecting a boundary between different liquids which can be easily mounted on a pipe for transferring liquids therethrough without any special mounting tool.

It is a yet further object of the present invention to provide an ultrasonic interface meter for detecting a boundary between different liquids which is useful in practical point of view.

BRIEF DESCRIPTION OF THE DRAWING

FIG. 1 is a schematic cross-sectional view of the main part of a conventional ultrasonic interface meter for detecting a boundary between different liquids;

FIG. 2 is a schematic diagram, partially in cross-section, of an ultrasonic interface meter for detecting a boundary between different liquids according to the present invention;

FIG. 3 is a graph used for explaining the operation of the present invention;

FIG. 4 is a block diagram for showing a part of the embodiment depicted in FIG. 2; and FIGS. 5A to 5G, inclusive, are respectively wave form diagrams used for explaining the part depicted in FIG. 4.

DESCRIPTION OF THE PREFERRED EMBODIMENT

With reference to FIG. 2, an embodiment of the present invention will be now described in detail. In FIG. 2 reference numeral 1 designates a common pipe for transferring therethrough different liquids 2 such, for example, as kerosene, light oil (fuel oil), gasoline and the like. In the common pipe 1 a liquid 2 flows in the direction shown by an arrow $a_2$ which is substantially parallel to the axial or longitudinal direction of the pipe 1. An ultrasonic wave transmitting element 3 is mounted on the outside of the pipe 1 by means of a mounting $3_1$ such as a wedge. The element 3 emits an ultrasonic wave into the liquid 2 through the wedge $3_1$ and the wall of the pipe 1 in a direction $a_3$ shown by the dotted line in the figure which is inclined with respect to the flow direction $a_2$ of the liquid 2 in the pipe 1 by an angle $\theta$ which is smaller than 90° ($\theta<90°$). An ultrasonic wave receiving element 4 is mounted on the outside of the pipe 1 by means of a mounting $4_1$ such as a wedge in such a position that it may receive the ultrasonic wave emitted from the element 3 and passed through the liquid 2 and the wall of the pipe 1. A thermosensitive element 6 such as a thermistor is mounted on the pipe 1 for compensating for temperature change in the liquid 2.

The ultrasonic wave transmitting element 3 is supplied with an electrical pulse signal from a signal transmitter circuit 7 to produce an ultrasonic wave pulse in synchronism with the pulse signal from the transmitter circuit 7. A receiver amplifier circuit 8 receives from the ultrasonic wave receiving element 4 the electrical signal which is in synchronism with the ultrasonic wave pulse received by the receiving element 4. The output signal from the amplifier circuit 8 is applied to a synchronizing circuit 9 and its output pulse signal is applied to the transmitter circuit 7 and also to a D-A converter circuit 10. A voltage adjuster circuit 11 is supplied with the analogue output signal from the D-A converter 10 to adjust the output signal. A correction voltage generating circuit 12 is supplied with the output signal from the thermosensitive element 6 and applies its output signal to an operation circuit 13 which is also supplied with the output signal from the voltage adjuster circuit 11. The output signal from the operation circuit 13 is then applied to an output circuit 14 which follows the output signal from the operation circuit 13.

A description will be now given of the operation of the embodiment mentioned just above. The transmitter circuit 7 is driven by the output pulse signal from the synchronizing circuit 9 to apply the pulse signal to the ultrasonic wave transmitting element 3 which then emits an ultrasonic wave pulse or beam substantially in synchronism with the pulse signal from the transmitter circuit 7 along the direction $a_3$ in the pipe 1. The emitted ultrasonic wave is received by the receiving element 4 after having passed through the wall of the pipe 1, the liquid 2 in the pipe 1 and then the wall of the pipe 1. The receiving element 4 then produces an electrical signal in synchronism with the received ultrasonic wave pulse. The electrical signal from the element 4 is applied to the synchronizing circuit 9 through the amplifier 8. The synchronizing circuit 9 produces an electrical pulse signal in synchronism with that from the element 4 and then applies it to the transmitting element 3 through the transmitter circuit 7, as mentioned above. The transmitting element 3 then emits another ultrasonic wave pulse. Thus, the signal circulates through the path of the transmitter circuit 7- the transmitting element 3- the liquid 2 - the receiving element 4 - the amplifier 8 - the synchronizing circuit 9 - the transmitter circuit 7 to carry out the so-called sing-around operation. The sing-around frequency corresponds with the sound velocity in the liquid 2 and is analog-converted through the D-A converter 10 consisting of a monostable multivibrator and a smoothing circuit, and the voltage adjuster circuit 11 and then applied to the operation circuit 13. Since the output derived from the operation circuit 13 is proportional, in voltage, to the velocity of sound in the liquid 2 flowing through the pipe 1, a boundary between different liquids flowing through the pipe 1 can be detected immediately by applying the output signal from the operation circuit 13 to an indicator $I_n$ through the output circuit 14 consisting of a voltage follower and an adjuster circuit Ad where it is indicated and can be observed as a change of the indication of the indicator.

Further, since in the present invention the thermosensitive element 6 for temperature compensation is provided as mentioned above and the output signal from the correction signal generating circuit 12, which is compensated for by the thermosensitive element 6, is applied to the operation circuit 13 together with the output signal from the voltage adjuster circuit 11, the variation of the sound velocity in the liquid 2 due to temperature changes can be compensated for by suitably setting the output signal from the circuit 12.

Another ultrasonic wave receiving element 5 may be mounted on the same side of the pipe as element $3_1$, and can be used instead of the element 4. A mounting $5_1$ such as a wedge supports element 5 in a position such that it may receive the ultrasonic wave reflected on the inner surface of the pipe 1 which passes along a path $a_4$ shown by the dotted line in FIG. 2. In this case, the electrical signal from the element 5 is applied to the amplifier circuit 8 to carry out the same operation mentioned above.

Now, if it is assumed that the sound velocity in the liquid 2 flowing through the pipe 1 is taken as $c$, the distance traveled of the sound in the pipe 1 is taken as $l$, the time which is required for the sound to travel through the wall of the pipe 1 and the mountings $3_1$ and $4_1$ is taken as $\tau$ and the sing-around frequency is taken as $f$; the following equation (1) can be obtained.

$$c = f l / 1 - f \tau \quad (1)$$

Since the value of $\tau$ is generally very small, it can be assumed that the condition $1 >> f \tau$ is satisfied. Accordingly, the equation (1) can be rewritten as the following equation (2).

$$c \cong fl \quad (2)$$

In practice, the value of $l$ can be easily calculated as the position of the elements 3 and 4 on the pipe 1 is determined and known. Accordingly, it is apparent that the sound velocity $c$ in the liquid 2 flowing through the pipe 1 can be obtained by measuring the sing-around frequency $f$.

As will be apparent from the foregoing description, with the present invention the sound velocity in the liquid is not measured directly, but the electrical (voltage) signal corresponding to the sound velocity in the liquid is obtained.

FIG. 3 shows a graph between the voltage signal (ordinate) and the time (abscissa). The point where a curve $e_1$ showing the relationship between the voltage signal and the time in the graph of FIG. 3 changes abruptly shows that a boundary between different liquids passes through a measured point.

With reference to FIG. 4 the adjuster circuit Ad will be now described in detail for detecting the boundary between the different liquids. As shown in FIG. 4 the output signal $e_1$ from the output circuit 14 is applied to one input terminal of a differential amplifier 16 directly and to the other input terminal thereof through an integrator circuit 15 with a suitable time constant. The output signal from the differential amplifier 16 is fed to two level detector circuits 17 and 18, respectively. The output signal from the level detector circuit 17 is directly applied to a stretcher circuit 20, but the output signal from the other level detector circuit 18 is fed through an inverter circuit 19 to the stretcher circuit 20. In this case, the level detector circuit 17 consists of a Schmitt circuit with, for example, a positive threshold voltage, and the level detector circuit 18 consists of a Schmitt circuit with, for example, a negative threshold voltage and the stretcher circuit 20 is for example, a monostable multivibrator.

A description will be now given of the operation of the adjuster circuit Ad with reference to FIGS. 5A to 5G. The voltage $e_1$ shown in FIG. 5A which corresponds to the case where boundaries between different liquids pass through the pipe 1 is fed to one of the input terminals of the differential amplifier 16 from the output circuit 14 as mentioned above and to the integrator circuit 15. The output signal $e_2$ from circuit 15 as shown in FIG. 5B, is fed to the other input terminal of the differential amplifier 16. The output signal $e_2$ is retarded by the time equal to the time constant of the integrator circuit 15 as shown in FIG. 5B. The differential amplifier 16 which is supplied with the signals $e_1$ and $e_2$ produces a signal $e_3$ as shown in FIG. 5C. As apparent from FIG. 5C the output signal $e_3$ from the differential amplifier 16 has positive and negative portions $e'_3$ and $e''_3$ of generally rectangular shape at the positions corresponding to the rising up and falling down portions of the analogue signal $e_1$. The level detector circuits 17 and 18, which have positive and negative threshold voltages, respectively, are supplied with the signal $e_3$ from the differential amplifier 16 and produce signals $e_4$ and $e_5$, respectively, as shown in FIGS. 5D and 5E. The inverter circuit 19 is supplied with the signal $e_5$ from the level detector circuit 18 and then produces a positive going signal $e_6$ shown in FIG. 5F. The stretcher circuit 20 is triggered by the signals $e_4$ and $e_6$ which are applied thereto from the level detector circuit 17 and the inverter circuit 19, respectively, and produces a signal $e_7$ as shown in FIG. 5G. The signal $e_7$ has rectangular portions $e'_7$ therein which rise up at the positions corresponding to the boundaries between the different liquids and continue during the time determined by the stretcher circuit 20. The output signal $e_7$ is applied to the indicator $I_n$ to drive it.

It is possible to apply the signal $e_7$ to an alarm device such, for example, as a buzzer which will give an alarms in response to the rectangular portions $e'_7$ of the signal $e_7$, indicating the boundaries.

It is possible to apply the signal $e_7$ to a changeover device such as a valve provided in the pipe 1 at its outlet to control the valve.

In practice, there balls made of, for example, rubber (which are generally called as pig) are inserted into the boundaries between different liquids in order to decrease contamination of the liquids. In such a case, passage of the ultrasonic wave is prevented temporarily by the balls and hence the output signal $e_1$ from the output circuit 14 abruptly decreases in level as shown in FIG. 5A on the right hand portion thereof. The adjuster circuit Ad used in the present invention, however, can produce the output signal $e_7$ in such a case positively.

As apparent from the above description, with the use of the adjuster circuit Ad, the output signal from the circuit 14 can be passed through the adjuster circuit Ad when the output signal exceeds a predetermined level to assure the detection of the boundaries between different liquids and also the duration times of the rectangular portions $e'_7$ of the signal $e_7$ corresponding to the boundaries between the different liquids can be prolonged which allows the boundaries to the detected without failure.

With the present invention an ultrasonic wave beam is emitted in the direction oblique to the flow direction of the liquid in a transfer pipe, in other words, to the surface on which the ultrasonic wave beam is reflected, so that the so-called sing-around operation is not disturbed by any multiple reflection (which does not occur in the invention) with the result that detection can be carried out positively with high accuracy.

Further, since the ultrasonic wave transmitting and receiving elements according to the present invention can be easily mounted on the pipe through which the liquid is transferred at a desired position without requiring any special mounting tools, it is very effective from the practical point of view.

In the foregoing description, the boundary between different liquids is detected with the analogue output signal. It is, however, possible that the change in the sing-around frequency f from the synchronizing circuit 9 to be detected by a suitable digital means so as to detect the boundary between different liquids.

It will be apparent that many changes and variations can be effected without departing from the scope of novel concepts of the present invention, so that the scope of the present invention should be determined by the appended claims only.

We claim as our invention:

1. An ultrasonic interface meter for detecting a boundary between different liquids comprising, an ultrasonic wave transmitting element mounted on a pipe through which liquid is transferred, a signal transmitter circuit for periodically applying an electrical signal to said ultrasonic wave transmitting element which then produces a corresponding ultrasonic wave in a direction oblique to the flow direction of said liquid in said pipe, an ultrasonic wave receiving element mounted on said pipe at a position so as to receive the ultrasonic wave emitted from said ultrasonic wave transmitting element after it has passed through said liquid in said pipe and producing an electrical output signal, an output electrical circuit receiving the electrical output signal from said ultrasonic-wave receiving element and controlling the period of said signal applied to said ultrasonic wave transmitting element and generating a sing-around frequency, an adjuster circuit connected to the output of said output electrical circuit and including an integrator circuit receiving an output of said output electrical circuit, a differential amplifier receiving an output of said output electrical circuit and the output of said integrator circuit, a pair of level detector circuits receiving the output of said differential amplifier, an inverter receiving the output of one of said level detector circuits, and an indicator receiving the output of said inverter circuit and the output of the other of said pair of level detector circuits.

2. An ultrasonic interface meter as claimed in claim 1 in which said ultrasonic wave receiving element is mounted on said pipe in such a position that it receives the ultrasonic wave which is not reflected.

3. An ultrasonic interface meter as claimed in claim 1 in which said ultrasonic wave receiving element is mounted on said pipe in such a position that it receives the ultrasonic wave which is reflected on the inner surface of said pipe.

4. An ultrasonic interface meter according to claim 1 wherein said ultrasonic wave transmitting element and said ultrasonic wave receiving element include a pair of wedges, and said wedges being mounted on the outside of said pipe such that the ultrasonic wave passes therethrough.

5. An ultrasonic interface meter according to claim 1 including a thermo-sensitive element attached to said pipe to monitor the temperature of said liquid and producing an electrical output signal, and a correction voltage generator receiving the output signal from said thermo-sensitive element and supplying an output signal to said output electrical circuit.

6. An ultrasonic interface meter for detecting a boundary between different liquids comprising, an ultrasonic wave transmitting element mounted on a pipe through which liquid is transferred, a signal transmitter circuit for periodically applying an electrical signal to said ultrasonic wave transmitting element which then produces a corresponding ultrasonic wave in a direction oblique to the flow direction of said liquid in said pipe, an ultrasonic wave receiving element mounted on said pipe at a position so as to receive the ultrasonic wave emitted from said ultrasonic wave transmitting element after it has passed through said liquid in said pipe and producing an electrical output signal, an output electrical circuit receiving the electrical output signal from said ultrasonic wave receiving element and controlling the period of said signal applied to said ultrasonic wave transmitting element and generating a sing-around frequency, an adjuster circuit connected to the output of said output electrical circuit and including an integrator circuit receiving an output of said output electrical circuit, a differential amplifier receiving an output of said output electrical circuit and the output of said integrator circuit, a pair of level detector circuits receiving the output of said differential amplifier, an inverter receiving the output of one of said pair of level detectors, a stretcher circuit receiving the output of said inverter and the output of said other one of said pair of level detectors, and an indicator receiving the output of said stretcher circuit.

7. An ultrasonic interface meter according to claim 6 including a thermosensitive element attached to said pipe to monitor the temperature of said liquid and producing an electrical output signal, a correction voltage generating circuit connected to said thermosensitive element and receiving the output signal therefrom and supplying an output signal to said output electrical circuit so as to compensate for temperature changes of said liquid flowing through said pipe.

* * * * *